United States Patent Office 3,217,612
Patented Nov. 16, 1965

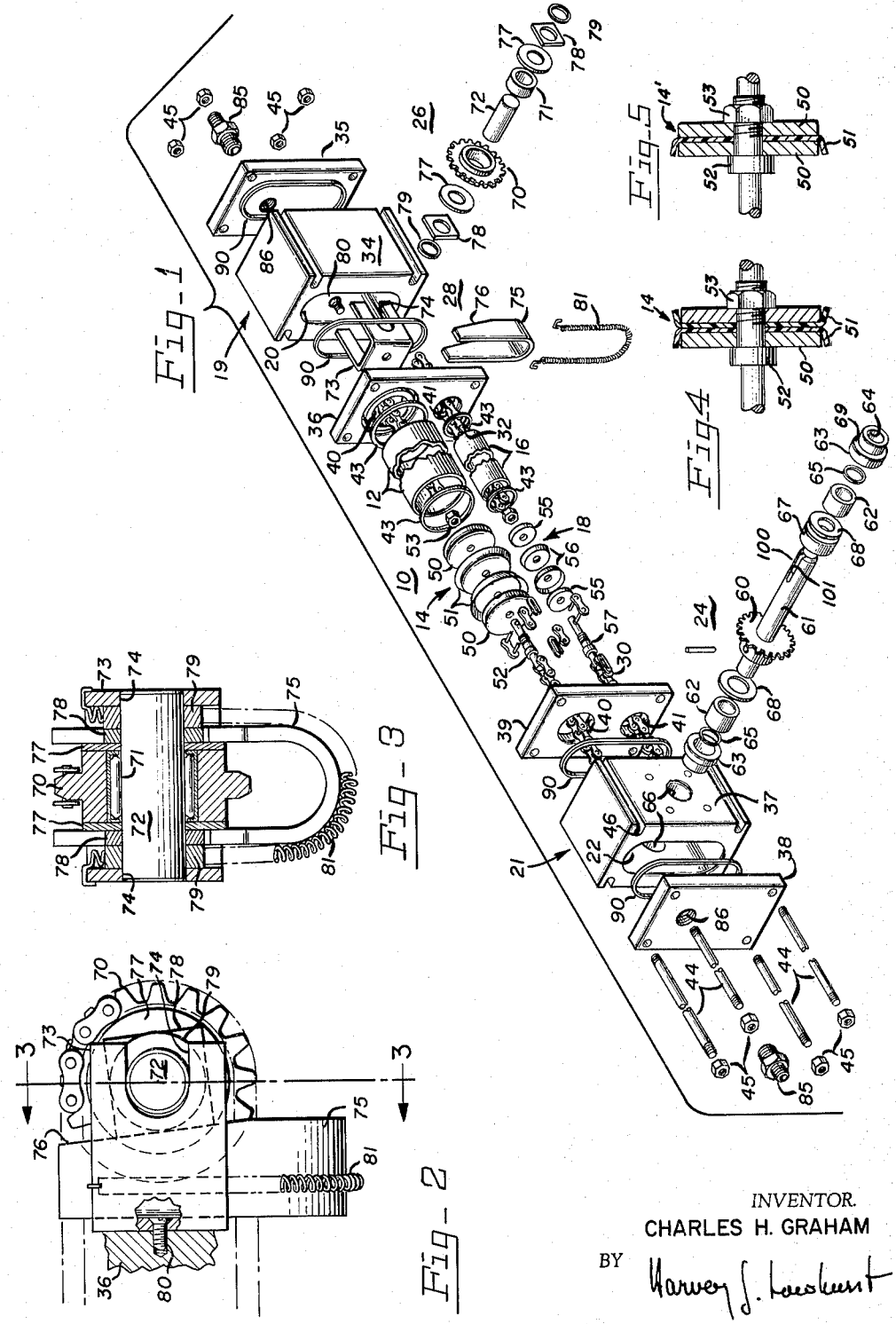
Nov. 16, 1965　　C. H. GRAHAM　　3,217,612
PISTON AND METHOD OF MAKING SAME
Filed Feb. 26, 1963
INVENTOR.
CHARLES H. GRAHAM
BY
ATTORNEY

3,217,612
PISTON AND METHOD OF MAKING SAME
Charles H. Graham, Mountain View, Calif., assignor to Graham Engineering Company, Inc., Palo Alto, Calif., a corporation of California
Filed Feb. 26, 1963, Ser. No. 260,995
5 Claims. (Cl. 92—244)

This invention relates generally to power translators incorporating one or more cylinders each having a piston reciprocable therein, and refers more particularly to improvements in the pistons for the cylinders of such power translators.

As brought out in Patent No. 3,121,371 issued to me on February 18, 1964, such power translators are in the nature of two-way mechanisms that are characterized by a power cylinder having a piston drivingly coupled with a shaft that can serve either as an input or an output for the translator. Thus, the translator can function to convert torsional force applied to the shaft from a prime mover into fluid pressure forces that can be utilized to operate equipment remote from the prime mover. Conversely, it can function to convert the pressure of fluid fed into one end or the other of its power cylinder into torsional force on the shaft to impart rotation to mechanism drivingly connected with the shaft.

The power conversion and motion transmitting efficiency of a power translator or actuator of this type depends to a large degree upon the efficacy of the seal between the bore of the power cylinder and the piston which is axially slidable therein and positively drivingly coupled to the shaft of the actuator. Accordingly, it is the purpose of this invention to provide an improved piston which is especially well suited, but not exclusively so, for use in the power cylinder of a power translator of the character described, because of its unique ability to establish a leak proof seal with the wall of the bore in the cylinder.

It is another object of this invention to provide a simple but efficient method of making the piston of this invention.

By way of example, the improved piston construction of this invention is herein disclosed as incorporated in the large diameter power cylinder as well as the small diameter sealing cylinder of a rotary actuator or power translator of the general type forming the subject of my aforesaid Patent No. 3,121,371. Housings connected to adjacent ends of the cylinders provide chambers by which said adjacent ends of the cylinders are communicated with one another. Each chamber houses a sprocket which is drivingly engaged by a chain having its ends fastened to opposite sides of the pistons in the power and sealing cylinders to interconnect the same. One of the sprockets provides a drive sprocket that is fixed to the input-output shaft, and the other sprocket is rotatably mounted on a floating stub shaft which is laterally movable and urged in a direction away from the drive sprocket by spring tensioned means to keep the chain taut and to prevent backlash.

Other objects and a better understanding of the invention may be had by reference to the following description, taken in conjunction with the accompanying drawings, in which:

FIGURE 1 is an exploded perspective view of a rotary actuator or power translator incorporating pistons constructed in accordance with the method disclosed hereinafter;

FIGURE 2 is an enlarged side view of the chain tensioning means supporting the idler sprocket;

FIGURE 3 is a sectional view taken along line 3—3 of FIGURE 2;

FIGURE 4 is an enlarged view illustrating a double acting piston of this invention, showing the component parts thereof in section; and FIGURE 5 is a view similar to FIGURE 4 but illustrating a single acting piston of this invention.

Referring now to the drawing, in which like reference characters designate like parts, there is shown a rotary actuator 10 generally like that of my aforesaid Patent No. 3,121,371. It comprises a power cylinder 12 having a power piston assembly 14 of this invention fluid tightly movable therein, a sealing cylinder 16 having a similar sealing piston assembly 18 fluid tightly movable therein, an upper chamber assembly 19 having a space 20 communicating the upper end of power cylinder 12 and sealing cylinder 16, and a lower chamber assembly 21 having a space 22 communicating the lower end of power cylinder 12 and sealing cylinder 16.

Device 10 further includes a drive sprocket assembly 24 mounted for rotation about a fixed axis in lower space 22 and a driven or idler sprocket assembly 26 mounted for rotation about a laterally movable shaft 72 held in a tensioning means 28 in upper space 20. There is also provided a lower chain 30 mounted for engagement with lower sprocket assembly 24 and having its ends respectively attached to one side of power piston assembly 14 and sealing piston assembly 18. Similarly an upper chain 32 is provided for engagement with upper sprocket assembly 26 which has its ends respectively attached to the other side of power piston assembly 14 and sealing piston assembly 18.

Upper space 20 is formed inside a housing 34, opposite ends of which have bolted thereto a coverplate 35 and a communicating plate 36. Similarly space 22 is formed inside a housing 37 opposite ends of which are closed respectively by a coverplate 38 and a communicating plate 39. To assure that chamber assemblies 19 and 21 are fluid tightly sealed, resilient seal members 90, such as conventional gaskets or O-rings, are interposed between plates 35, 36 and housing 34 and between plates 38, 39 and housing 37.

Interposed between communicating plate 36 and 39, and spacing the same, are power cylinder 12 and the sealing cylinder 16 which are disposed parallel to one another and are of equal length. Suitable openings such as 40 and 41 are provided in communicating plates 36 and 39 to communicate space 20 and space 22 with the bores of cylinders 12 and 16. To provide a fluid tight seal between opposite end portions of cylinders 12 and 16 and communicating plates 36 and 39 respectively, resilient seal members 43 are utilized in the conventional manner. It has been found convenient to form openings 40 and 41 with shoulders facing the adjacent cylinders and having counterbores dimensioned to accommodate the outside diameter of the cylinders. The bore defining the shoulder is selected to be equal in diameter to the internal diameter of associated cylinders.

Device 10 described so far is easily assembled by using four clamping bolts 44 which pass through suitable openings in plates 38, 39, 36 and 35 and which have threaded end portions for engaging clamping nuts 45. Suitable recesses 46 in housings 34 and 37 may be provided to accommodate bolts 44. In this manner, chamber assemblies 19 and 21 are clamped from opposite sides across cylinders 12 and 16 to thereby form a fluid tight device between end plates 38 and 35.

In accordance with this invention, power piston assembly 14 comprises a pair of piston washers 50 clamped from opposite sides across a pair of flexible sealing cups 51. Sealing cups 51 are flexible metallic or plastic washers preferably not thicker than a few thousandths of an inch, as for example, between .003 and .050 inch, and having their outer edge portion, larger in diameter by about 5% of the cylinder diameter, cupped around their adjacent piston washers. The cupping is best accomplished by spinning the piston assembly and at the same time bending or drawing the rim about the outer washer by the application of pressure in an outwardly direction. The diameter of the washer is smaller than the internal cylinder bore by about twice the thickness of the flexible stock from which the sealing cups are made, and at times this dimension is further diminished in proportion to the pressure applied. It has been found that for a 1.5 inch diameter cylinder the diameter of the washer is decreased by about 0.010 inch for every 100 pounds of pressure. Piston assembly 14 is held together by a threaded piston stud 52 having a shoulder engaging one washer 50 and a nut 53 engaging the other washer 50.

Similarly, sealing piston assembly 18 comprises a pair of piston washers 55 for clamping across opposite sides of a pair of sealing cups 56 by means of piston stud 57. Cup seal 56 may be formed in the same manner outlined above, that is, by spinning the piston assembly and drawing the projecting peripheral portion of sealing cups 56 over the adjacent edge of associated piston washers 55.

Preferably, the pressure exerted on the spinning assembly by a spreading tool should generate sufficient heat for the rims of the cups to take on a set which may leave the rims, when relaxed, in the slightly outwardly flared condition shown. The blanks from which the cups are made may be roughed out slightly oversize, and the rims, after deformation in the manner described, are trimmed to have their outer edge portions terminate at a plane substantially normal to the axis of the piston assembly.

As seen in FIGURE 5, a piston assembly 14' for single acting service can be produced using but one sealing cup 51 clamped between the washers 50. A single acting piston of this type is mounted in its cylinder with the rim of its cup facing the end of the cylinder into which pressure fluid is admitted.

Drive sprocket assembly 24 comprises a drive sprocket 60 integrally affixed to an output shaft 61 which is rotatably mounted by means of a pair of Oilite bearings 62 press-fitted into a pair of bearing cups 63. To provide a fluid tight seal between output shaft 61 and bearing cups 63, the latter are provided with inner shoulders 64 facing sprocket 60. Resilient seal members 65, such as O-rings, are placed into the bore of bearing cups 63 and against shoulders 64. Thereafter bearings 62 are press fitted into the bore against seal members 65. In this manner, seal means 65 is firmly held in place and output shaft 61 is fluid tightly sealed to bearing cups 63. Bearing cups 63 are press fitted into bores 66 in housing 37 from the inside of space 22 to seat firmly with their shoulders 69 against the housing side wall. There is also provided spacer member 67 and a pair of spacer washers 68 on output shaft 61 to position drive sprocket in chamber 22. Output shaft 61 has an extending portion 100 which projects out of housing 37 and which is provided with some fastening means such as key-way 101 for coupling to a utilization device.

Idler sprocket assembly 26 comprises an idler sprocket 70 having a bore into which is press fitted on Oilite bearing 71, and a shaft 72 rotatably journalling sprocket 70. Of course instead of utilizing Oilite bearing for bearings 62 and 71, other types of bearings such as conventional needle or ball bearings or the like may be used. Shaft 72 is supported in tensioning means 28 which though described herein, is disclosed and claimed in my copending application Serial No. 425,000 filed January 12, 1965, as a division of this application. This tensioning device comprises a take-up yoke 73 having a pair of U-shaped slots 74 for receiving shaft 72 and permitting it to move transversely to its axis in the plane defined by slots 74. Tensioning means 28 further comprises take-up wedge 75, having a pair of inclined surfaces 76. Take-up wedge 75 is dimensioned to be received by take-up yoke 73 and move transversely to shaft 72. Mounted upon shaft 72, on either side of sprocket 70 and separated therefrom by a pair of washers 77, are a pair of take-up shoes 78 for engaging inclined surface 76 so that when take-up wedge 75 moves forward or backwards it raises or lowers take-up shoes 78 and thereby moves shaft 72 either up or down. Between take-up shoes 78 and the sides of take-up yoke 73 are a pair of spacers 79 to position take-up shoes 78 for engagement with take-up wedge 75.

Take-up yoke 73 is mounted, by means of a screw 80 or the like, to connecting plate 36 so that it is rigid with upper chamber assembly 19. To control the tension, an extension spring 81 is wrapped around take-up wedge 75 and anchored, at both ends, to take-up yoke 73. In this manner, take-up wedge is continually urged inwardly to thereby move inclined surfaces 76 in the direction to raise take-up shoes 78 and thereby shaft 72 in slots 74 to increase tension on chains 30 and 41. Tensioning means 28 thus urges idler sprocket assembly 26 away from the sprocket assembly 24, thereby keeping the chain and piston assembly taut.

It is noteworthy that the tensioning device is capable of performing its function with only a relatively light spring force acting upon the take-up wedge 75. This is possible because of the gentle taper on the surfaces 76 of the wedge, which are so slightly inclined that the wedge will have no tendency to be backed out of its operative chain tensioning position under the influence of a load on the chain during operation of the actuator, and will readily move inwardly by the action of the relatively light spring thereon in any slackness in the chain tends to develop.

In operation of the actuator 10, both power piston assembly 14 and the sealing piston assembly 18 are simultaneously subjected to pressurized actuating fluid introduced into either space 20 or space 22. Fittings 85, together with threaded openings 86 in end plates 35 and 38 provide suitable means for introduction of the actuating fluid into adjacent ends of the power and sealing cylinders. Preferably, both chambers 20 and 22 are connected, through fittings 85, in a hydraulic system through suitable valving so that high pressure fluid can be directed into either chamber to effect rotation of the output shaft 61 in one direction or the other. Similarly, torque applied to the shaft 61 can effect expulsion of fluid under pressure from either chamber, depending upon the direction of shaft rotation, for operation of hydraulic instrumentalities connected with said chambers.

The effect of the simultaneous subjection of both power piston assembly 14 and sealing piston assembly 18 to presurized fluid admitted into either chamber is that both tend to be driven toward the other chamber. Since the two pistons are connected by the chains, however, they cannot both move in the same direction. Accordingly, the power piston, having a much larger area than the sealing piston, becomes the driving piston and carries the sealing piston with it, but in the opposite direction.

Since the useful power developed by actuator 10, when utilized to translate hydraulic pressure into rotation of the output shaft 61, is equal to the total force on the power piston less the total force on the sealing piston, the ratio of their respective areas should be as large as possible. The only function of the sealing piston is to provide a fluid tight return path for the chain which links the opposite sides of the power piston to drive sprocket 60. Accordingly, the smaller the area of the sealing piston, the more efficient is device 10.

As the power piston moves downstream, it moves chain 30, held taut by tensioned sprocket 70. As chain 30 moves, it rotates output shaft 61 which performs useful work by being coupled to a utilization device. Control of piston velocity, piston speed and output torque, is entirely controlled by fluid flow velocity, fluid flow acceleration and fluid pressure.

There has been described an improved piston which is especially adapted for incorporation a rotary actuator device useful in providing controlled rotary motion of an output shaft in response to the application of a pressurized fluid. To avoid any backlash of the output shaft, a tensioning means is supplied to carry the idler sprocket under controlled tension. This tensioning means also automatically compensates for any unevenness in the several links making up the chain and in any eccentricity of the sprockets or sprocket shafts or for wear of the sprocket shaft support bearings.

What is claimed is:

1. A piston assembly, comprising:
   (a) a pair of flexible sealing cups, each cup having a thickness selected from a range between 0.060 and 0.003 inch and constructed of an annular blank having an outer diameter which is between 3 and 7 percent greater than the inner diameter of the cylinder for which the piston assembly is intended, and having a cupped outer peripheral annular edge;
   (b) a pair of annular washers, each washer having an outside diameter which is smaller than the inner diameter of the assocaited cylinder by twice the thickness of a sealing cup and by a predetermined small dimension selected in accordance with the total cylinder pressure and inner diameter; and
   (c) means for clamping said pair of seal cups with their cupped edges facing in opposite directions between said pair of washers.

2. A movable piston for forming a fluid-tight seal across a cylinder and comprising:
   (a) a flexible sealing cup having a thickness selected from a range between 0.003 and 0.050 inch and constructed of an annular blank having an outer diameter which is between 3 and 7 percent greater than the inner diameter of the cylinder, and having a cupped outer peripheral annular edge;
   (b) an annular washer having an outside diameter which is smaller than the inner diameter of the cylinder by twice the thickness of a sealing cup and by a predetermined small dimension selected in accordance with the total cylinder pressure and inner diameter; and
   (c) means for clamping said sealing cup between a pair of said washers, said cup being arranged so that said cupped edge thereof extends toward the side of the piston that is to be subjected to fluid under pressure in a cylinder for which the piston is intended.

3. A movable double-acting piston for forming a fluid-tight seal across a cylinder and comprising:
   (a) a pair of flexible sealing cups, each cup having a thickness selected from a range between 0.003 and 0.050 inch and constructed of an annular blank having an outside diameter which is between 3 and 7 percent greater than the inner diameter of the cylinder, and having a cupped outer peripheral annular edge;
   (b) a pair of annular washers, each washer having an outer diameter which is smaller than the inner diameter of the cylinder by twice the thickness of a sealing cup and by a predetermined small dimension selected in accordance with the total cylinder pressure and inner diameter; and
   (c) means for clamping said pair of seal cups with their cupped edges facing in opposite directions between said pair of washers.

4. A method of constructing a piston which forms a fluid tight seal across a cylinder, said method comprising the steps of:
   (a) blanking a pair of annular sealing cups to have an outside diameter which is a selected amount larger than the inner diameter of said cylinder;
   (b) clamping a pair of said sealing cups back-to-back between a pair of washers having a diameter a selected amount smaller than the inner diameter of the cylinder;
   (c) spinning said clamped pair of sealing cups and washers at high speed;
   (d) spreading the edge portions of said clamped pair of sealing cups in opposite directions and over the peripheral surfaces of said pair of washers respectively with a spreading tool, the spinning speed of the clamped pair of sealing cups and the pressure with which the spreading tool is urged against the edge portion of said clamped pair of sealing cups being selected to generate sufficient heat for the spread edge portions to take on a set; and
   (e) trimming the set edge portions to make the same planar and sharp.

5. A method of constructing a piston which forms a fluid tight seal across a cylinder and which includes a pair of annular sealing cups clamped between a pair of annular washers, said method comprising the steps of:
   (a) blanking annular sealing cups to have an outer diameter which is larger by at least 5% than the inner diameter of said cylinder, said blanking producing a slightly downward bent edge portion;
   (b) clamping a pair of said sealing cups back-to-back, with the bent edge portions facing away from one another, between a pair of washers having a diameter equal to that of the cylinder diminished by twice the thickness of one of said sealing cups and further diminished by a clearance factor which is a function of the desired pressure capability of said piston;
   (c) spinning said clamped pair of sealing cups at high speed;
   (d) spreading the edge portion of said clamped pair of sealing cups in opposite directions and over the peripheral surfaces of said pair of washers respectively with a spreading tool, the spinning speed of the clamped pair of sealing cups and the pressure with which the spreading tool is urged against the edge portion of said clamped pair of sealing cups being selected to generate sufficient heat for the spread edge portions to take on a set; and
   (e) trimming the set edge portion to make the same planar.

References Cited by the Examiner

UNITED STATES PATENTS

| | | | |
|---|---|---|---|
| 2,663,600 | 12/1953 | Newhall | 92—244 |
| 2,844,127 | 7/1958 | Steiner | 92—68 |
| 2,946,320 | 7/1960 | Vogel | 92—68 |
| 2,987,354 | 6/1961 | Olson | 92—244 |

OTHER REFERENCES

Dwars: German application Serial No. D 20,765, printed July 5, 1956.

RICHARD B. WILKINSON, *Primary Examiner.*